(12) United States Patent
Lock et al.

(10) Patent No.: US 7,190,871 B2
(45) Date of Patent: Mar. 13, 2007

(54) POLYSILANE THIN FILMS FOR DIRECTLY PATTERNABLE WAVEGUIDES

(75) Inventors: John Lock, Cambridge, MA (US); Lionel C. Kimerling, Concord, MA (US); Karen K. Gleason, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/410,061

(22) Filed: Apr. 9, 2003

(65) Prior Publication Data

US 2003/0215203 A1 Nov. 20, 2003

Related U.S. Application Data

(60) Provisional application No. 60/370,976, filed on Apr. 9, 2002.

(51) Int. Cl.
*G02B 6/10* (2006.01)
(52) U.S. Cl. ............... 385/129; 385/130; 385/131; 385/132
(58) Field of Classification Search ......... 385/129–132
See application file for complete search history.

(56) References Cited

U.S. PATENT DOCUMENTS

| | | | |
|---|---|---|---|
| 5,482,656 A * | 1/1996 | Hiraoka et al. | 252/514 |
| 5,506,008 A | 4/1996 | Klumpp et al. | |
| 5,530,956 A | 6/1996 | Hiraoka et al. | |
| 5,802,233 A | 9/1998 | Sugi et al. | |
| 6,090,530 A | 7/2000 | Weidman et al. | |
| 2002/0150368 A1* | 10/2002 | Imoto | 385/132 |
| 2005/0002629 A1* | 1/2005 | Okamoto et al. | 385/129 |

FOREIGN PATENT DOCUMENTS

| | | | |
|---|---|---|---|
| EP | 1 154 323 | | 11/2001 |
| JP | 06-222234 | * | 8/1994 |
| JP | 06222234 | | 8/1994 |
| JP | 2000075151 | | 3/2000 |

OTHER PUBLICATIONS

M.C.Kwan and K.K.Gleason, "Pyrolytic CVD of Poly(organosiloxane) Thin Films", Chemical Vapor Deposition, 6, pp. 299-301(1997).*
H.Tsushima et al., "Novel manufacturing process of waveguide using selective photobleaching of polysilane films by UV light irradiation", Proc. of SPIE vol. 5246, pp. 119-130(2003).*
OSA Handbook of Optics, M.Bass Editor, McGraw Hill, pp. 6.3(1995).*
R.G.Hunsperger, "Integrated Optics: Theory and Technology", Springer-Verlag, pp. 90-91(1985).*
"Polysilane High Polymers," Miller et al. *Chemical Reviews*. 1989. vol. 89, No. 6.

(Continued)

*Primary Examiner*—Leonidas Boutsikaris
(74) *Attorney, Agent, or Firm*—Gauthier & Connors LLP

(57) ABSTRACT

A waveguide structure includes a substrate. A layer of high index material includes polysilane, which is patterned using a UV light source to form a waveguide.

18 Claims, 4 Drawing Sheets

OTHER PUBLICATIONS

"Polyalkylsilyne Photodefined Thin-Film Optical Waveguides," Hornak et al. *Journal of Applied Physics*. Mar. 1990. vol. 67.

"Photooxidation Studies on Branched Polysilanes," Sartoratto et al. *Eur. Polym. J.* 1997. vol. 33, No. 1.

"SiC/SiO$_2$Micropatterning by Ultraviolet Irradiation and Heat Treatment of a Poly(phenylsilyne) Film," *Journal of Applied Physics*. Mar. 1995. vol. 77.

"Critical Issues in 157nm Lithography," Bloomstein et al. *Journal of Vacuum Science Technology*. Nov./Dec. 1998. vol. 16.

"Plasma Polymerized Methylsilane II. Performance for 248 nm Lithography," Monget et al. *Journal of Vacuum Science Technology*. Mar./Apr. 2000. vol. 18.

"Plasma Enhanced Chemical Vapor Deposition of Organosilicon Materials: A Comparison of Hexamethyldisilane and Tetramethylsilane Precursors," Fonseca et al. *Macromolecules*. 1996. vol. 29.

"Solid-State Characterization of Polysilanes Containing the SIH Bond," Schilling et al. *Macromolecular Symposia*. 1994. vol. 86.

"Patterned Emission in Organic Electroluminescent Device Using Photodecomposition of Polysilane Film by UV Light," Hiramoto et al. *Jpn. J. Appl.. Phys.* 1996. vol. 35.

"Pyrolyctic CVD of Poly(organosiloxane) Thin Film," Kwan et al. *Chem. Vap. Deposition.* 1997. vol. 3, No. 6.

\* cited by examiner

POLYSILANE THIN FILMS FOR DIRECTLY PATTERNABLE WAVEGUIDES

PRIORITY INFORMATION

This application claims priority from provisional application Ser. No. 60/370,976 filed Apr. 9, 2002, incorporated herein by reference in its entirety.

BACKGROUND OF THE INVENTION

The invention relates to the field of polysilane thin films, and in particular to forming patternable waveguides using polysilane.

The traditional fabrication process for microelectronics is approaching physical boundaries on multiple fronts as the demand for faster computer chips continues to follow Moore's Law. Photonic chips offer a potential solution with the use of high bandwidth optical circuitry. Polysilane materials synthesized using plasma enhanced chemical vapor deposition (PECVD) are photorefractive polymers that undergo a change in refractive index upon exposure to ultraviolet light. This contrast has been observed to be on the order of 5%.

A waveguide with this level of refractive index contrast can turn with a radius of 1 mm and continue to contain light. The PECVD polysilanes are highly transmissive to light in the visible and near infrared regions of the spectrum, which are most commonly utilized in photonic applications. Traditional waveguide microfabrication involves the use of solvent and aqueous rinse. Thus, there is a need in the art to use a dry fabrication process to form patternable waveguides without using solvents or aqueous rinses.

SUMMARY OF THE INVENTION

According to one aspect of the invention, there is provided a waveguide structure. The waveguide structure includes a substrate. A layer of high index material includes polysilane, which is patterned using a UV light source to form a waveguide.

According to another aspect of the invention, there is provided a method of forming a waveguide structure. The method includes providing a substrate. Furthermore, the method includes providing a layer of high index material including polysilane, which is patterned using a UV light source to form a waveguide.

DETAILED DESCRIPTION OF THE INVENTION

In forming a polysilane thin film in accordance with the invention, a 1208 Å layer is deposited on a silicon wafer and on a Corning Suprasil fused silica glass substrate using a conventional PECVD technique. The reactor is initially pumped down to a pressure of 50 mTorr and purged with dry nitrogen. This purge cycle is performed five times in order to reduce the amount of oxygen present in the reactor chamber. The substrate stage is heated to a temperature 140° C. and 10 sscm of dimethylsilane gas is introduced to the reactor. The chamber pressure is regulated at 300 mtorr. A 13.56 Mhz RF plasma is operated at a continuous power of 50W. The deposition time is 7 minutes. Variable angle spectroscopic ellipsomtry (VASE) is used to determine the film thickness, which is 1208 A. However, in other embodiments the values regarding the RF plasma, pressure, substrate temperature, and deposition time can vary.

Figure 1:
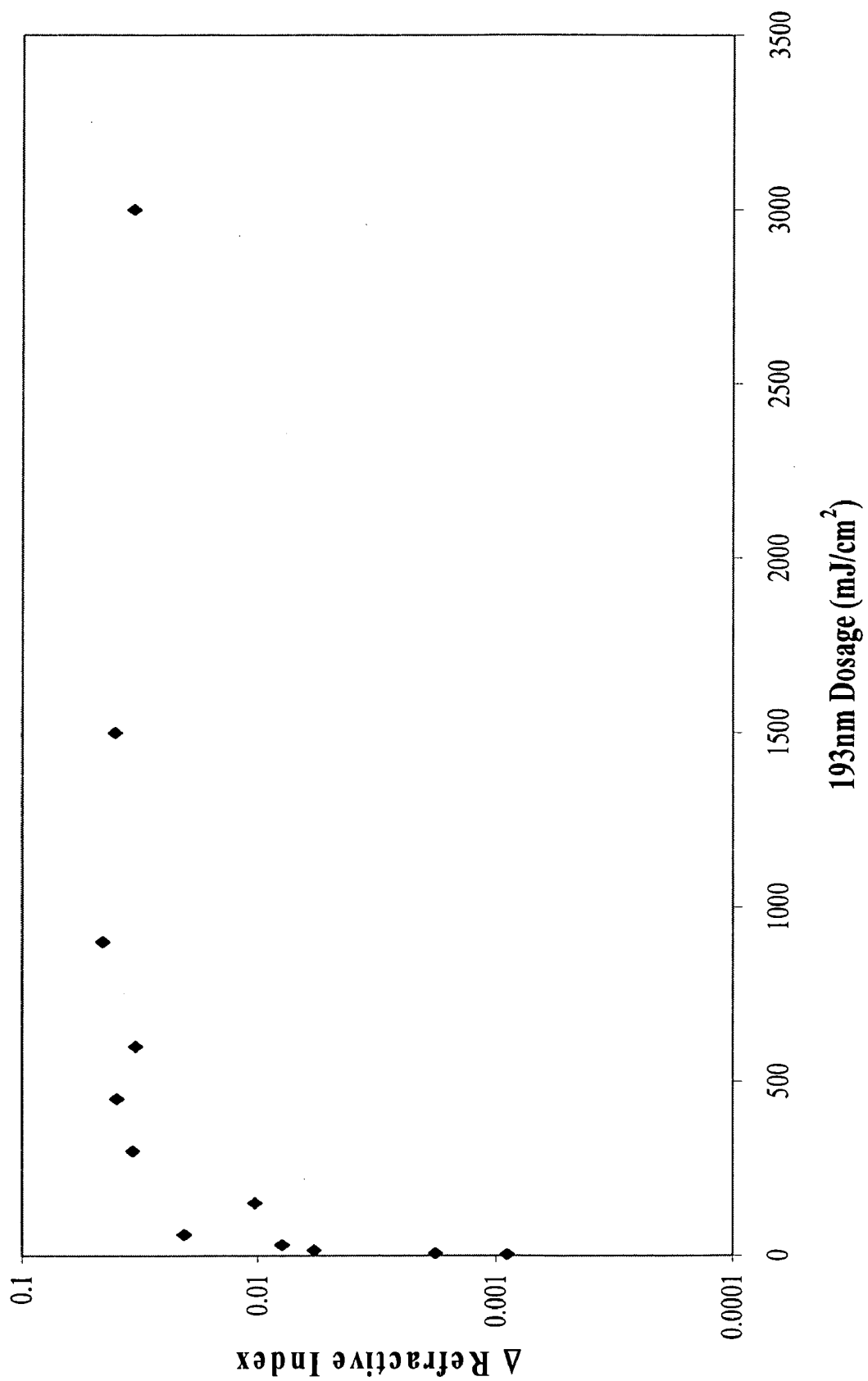
FIG. 1 is a graph showing the resulting contrast curve for a polysilane film formed in accordance with the invention.

FIG. 1 is a graph showing the resulting contrast curve for a polysilane film formed in accordance with the invention. To confirm the photorefractive response of the polysilane material, the deposited film is exposed to a 193 nm laser. The film is irradiated with blanket exposures ranging dosages from 3 mJ cm$^{-2}$ to 3000 mJ cm$^{-2}$. The vertical axis of the graph is the difference in the refractive index between the exposed region of the film and unexposed region. A reduction in the refractive index is seen upon exposure to ultraviolet light. VASE is used to measure the refractive indexes.

Figure 2:
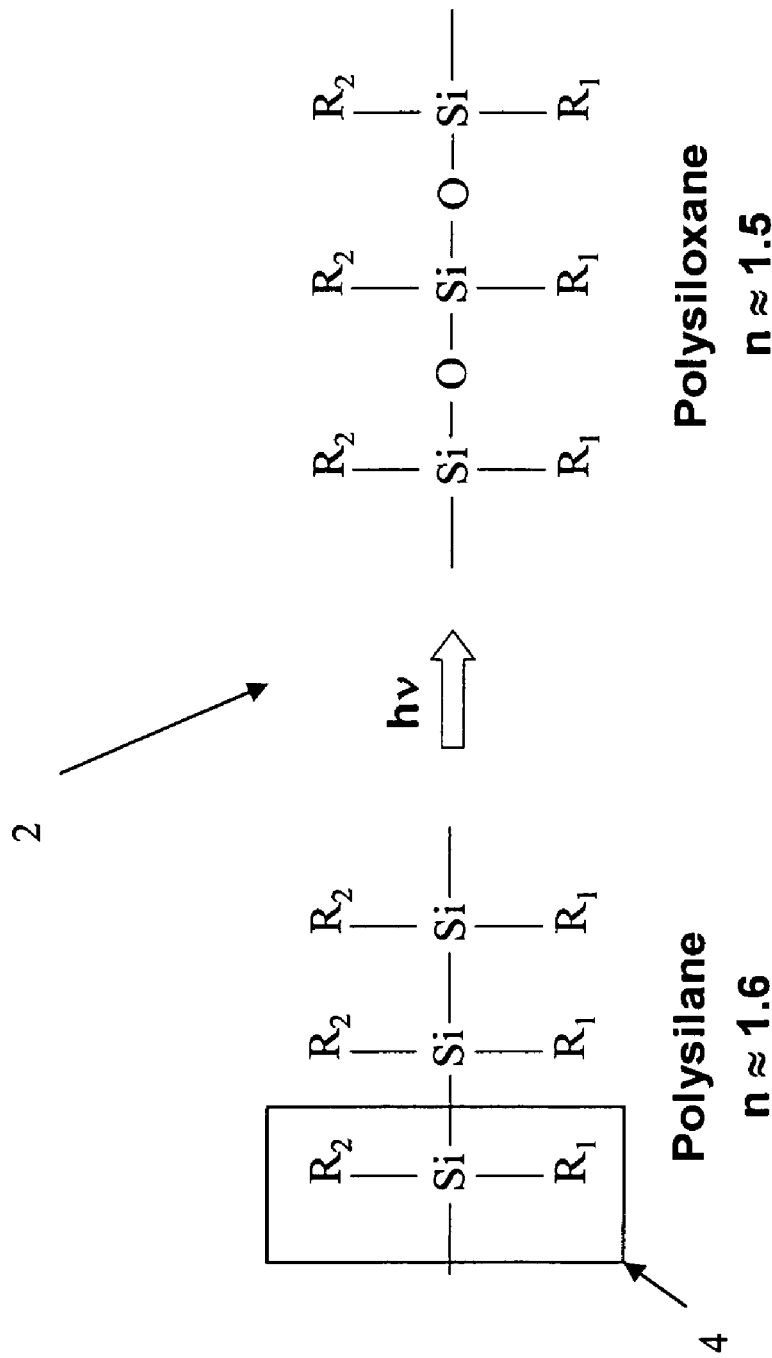
FIG. 2 is a schematic diagram of the photooxidation used in forming the polysilane film.

FIG. 2 is a schematic diagram of the photooxidation used in forming the polysilane film. The refractive index of polysilane changes due in part to the photooxidation reaction upon exposure to ultraviolet light. The molecular configuration 2 of polysilane is shown in FIG. 2. Polysilanes are polymers composed of catenated silicon atoms that form a linear chain or molecular repeat units 4. Cross linking can occur between chains to form a networked or amorphous polysilane material that is also photoresponsive and useful as a waveguide. The elements R1 and R2 are carbon-based ligands, such as methyl or phenyl groups. The Si—Si bond strength is 326.8 KJ/mol or 3.84 eV3, which corresponds to light of a wavelength of about 366 nm. As Si—Si bonds are cleaved by higher-energy light, oxygen readily incorporates into the film to form a polysiloxane material as shown in FIG. 2. The polysiloxane material has a lower index than the polysilane material, because of the presence of the oxygen and a resulting decrease in the molecular density of the material.

Figure 3:
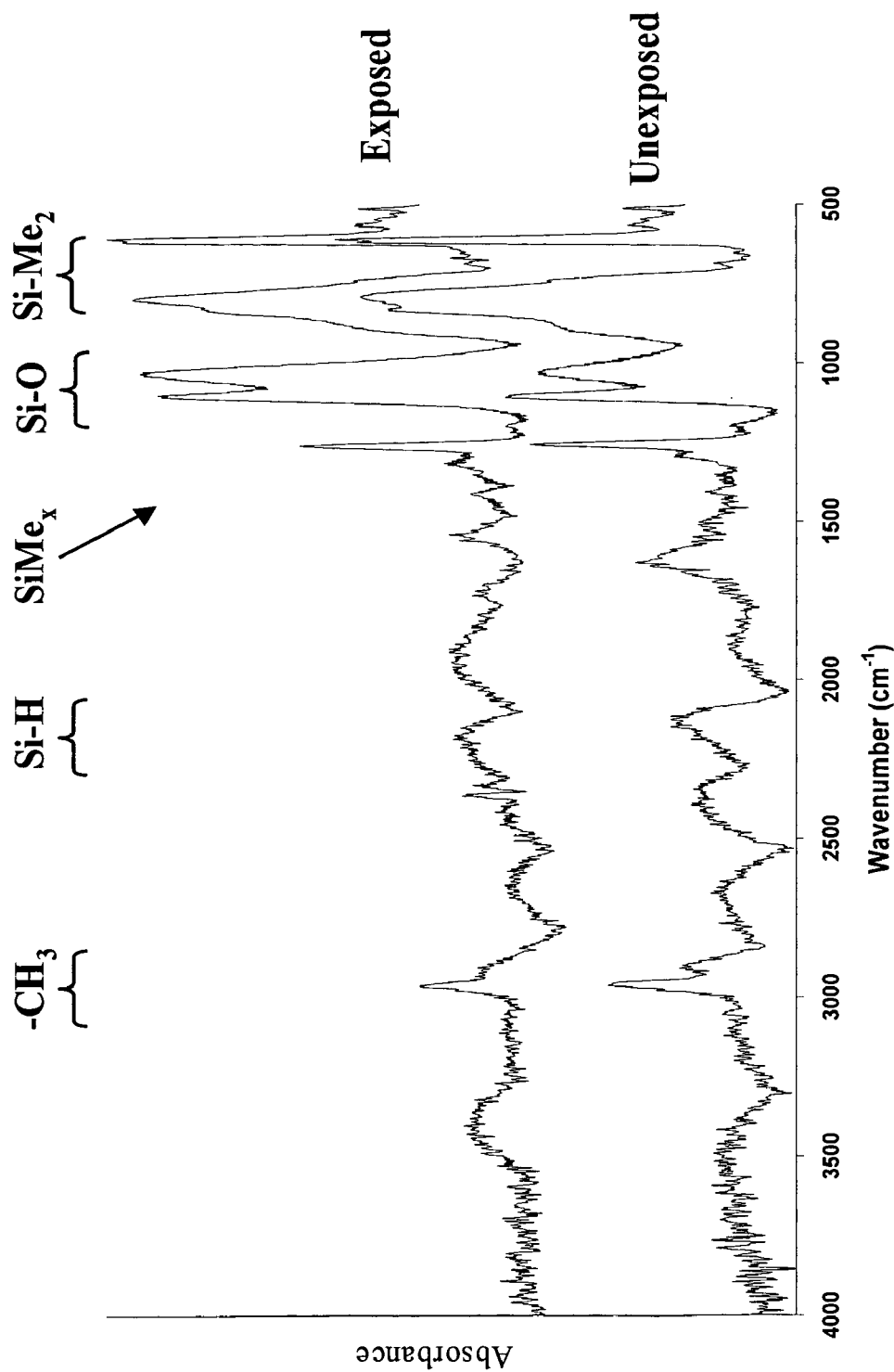
FIG. 3 is a Fourier transform infrared (FTIR) spectra of the polysilane film before and after irradiation.

Fourier transform infrared (FTIR) spectra of the polysilane film before and after irradiation shows an increase of Si—O stretch intensity, as shown in FIG. 3. This is consistent with the oxygen uptake mechanism, which involves an insertion reaction of oxygen into Si—Si bonds to form more stable Si—O—Si bonds. Oxygen absorbs 193 nm light, so the exposures for the contrast index indicate that oxidation occurs nonetheless, which implies that the bonds are cleaved and then oxidized by residual oxygen or exposure to the atmosphere after irradiation. It may be possible to realize higher refractive index contrast using a 248 nm laser that can operate in an oxygen-rich environment. Also, the 193 nm irradiation environment was not completely oxygen free. Instead of a perfect vacuum environment, the exposure was performed at ambient pressure and transmission of the laser beam was enabled with a jet of purified nitrogen. Some ambient oxygen was present, but not enough to drastically attenuate the laser.

Given the photorefractive response of the polysilane films deposited using PECVD, it can be possible to form patternable waveguides using this material. FIGS. 4A–4D are schematic diagrams demonstrating the steps in forming a patternable waveguide using polysilane thin films. The polysilane are deposited with PECVD.

Figure 4A:
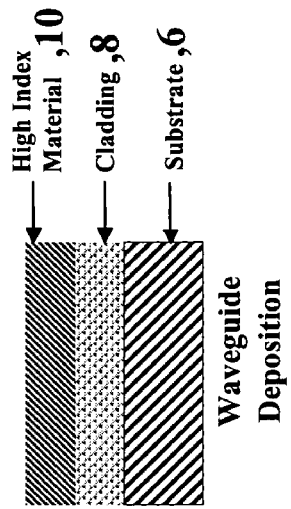
FIGS. 4A–4D are schematic diagrams demonstrating the steps in forming a patternable waveguide using polysilane thin films.

FIG. 4A shows the first step of forming the polysilane patternable waveguide. A low index cladding material 8 is deposited on a silicon substrate 6. This cladding material 6 is needed in order to isolate light in the waveguide from the higher index silicon substrate 6. Moreover, the low index cladding material 8 can be $SiO_2$ or any other conventional organo silicon glass (OSG) material, which can be deposited by CVD. A low-index spin-on material would also be acceptable for the cladding. Alternatively, a glass or plastic substrate can be used in place of the silicon substrate, which would have lower refractive index than the polysilane material, which must be lower than about 1.5. When using a glass or plastic substrate, the deposition of a low index cladding material is avoided because the lower index of the glass or plastic substrate does not hinder isolating light in the waveguide.

Figure 4C:
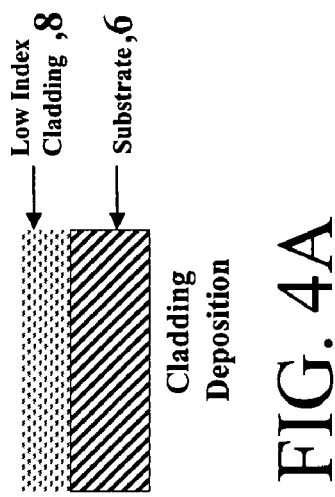
Figure 4B:
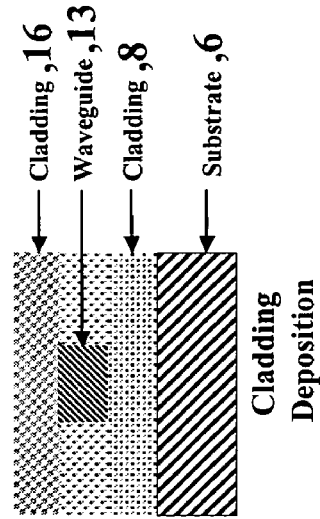

FIG. 4B shows the second step of forming the patternable waveguide. A polysilane material layer 10 is deposited on the low index cladding 8 material using PECVD deposition. FIG. 4C demonstrates patterning into a waveguide 13 the polysilane material 10 using UV light source 14. The exposed polysilane material 10 undergoes photooxidation and the refractive index decreases resulting in a pattern that defines the cladding along the sides of the waveguide 13. No photoresist or etch step is needed for the waveguide patterning since the polysilane layer 10 itself changes chemically upon irradiation. Afterwards, the waveguide 13 is functional since only air is on top that provides better cladding than any other material due to its refractive index of 1.

Figure 4D:
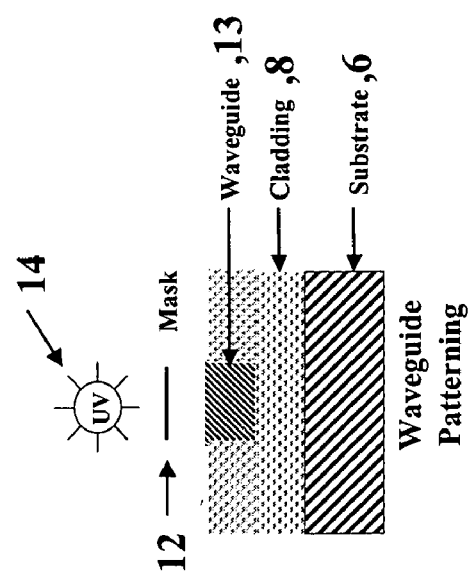

However, in a manufacturing production process, there is a need to cap the waveguide with a top index cladding layer 16 using CVD, as shown in FIG. 4D. This top layer 16 will protect the waveguide 13 from being damaged and will also provide a foundation for building additional functional layers (photonic or microelectronic) on top of this base layer. Swelling of the polysilane material upon irradiation has been less about 0.1%, so we do not anticipate the need for planarization in the steps shown in FIGS. 4C and 4D.

The process described regarding forming a patternable waveguide using polysilane offers a completely dry and solventless method. No aqueous rinses, chemical ethchants or photoresists are needed, all of which currently produce million of gallons of harzardous waste in microfabrication facilities. The CVD deposition process also uses very low flow rates of precursor gases reducing the amount of chemical waste generated to deposit film.

A 5% refractive index contrast corresponds to turning radius of 1 mm. This is not a small enough dimension for microchip features. However, PECVD polysilanes are an excellent material for defining waveguides in an interconnect layer of photonic systems analogous to the printed wire boards that link chips and other components in conventional microelectronic devices. A printed waveguide board will also be essential for interfacing photonic chips with fiber optic communication. The current solution for this interface involves the use of fiber leads into the side of the photonic devices that would have to be 4 inches long in order to accommodate splicing techniques. Added to the fact that conventional fiber optics have a turning radius of only 1 cm or so means that an unwieldy scramble of fibers would have to be contained in the package of a photonic device. In order to couple fiber optic cores that have a diameter of about 10 µm to chip size waveguides with dimensions under a micron, the polysilane waveguides should be between 2 and 5 µm in size. These dimensions are easily obtainable using 248 or 193 nm light. Also, two-micron dimensions are predicted by simulation to contain 1.55 µm light. Slightly smaller waveguide dimensions of about 1 µm would be most suitable for containing on-board 850 nm light, but does not interfere with the above-mentioned coupling problem since 850 nm light is produced by potential on-board GaAs lasers—no coupled in from outside Ethernet sources.

Polysilanes are highly transmissive to light with wavelengths above 400 nm. Therefore, polysilanes can be used to guide light used for long haul application that have a wavelength of 1.55 µm as well as 850 nm light which will probably be necessary for the realization of photonic devices. The 850 nm light is essential for use in photonic applications because it can be generated using GaAs lasers and detected with Si. Transparency for both 1.55 µm and 850 nm light reinforces the value of polysilanes as an interconnect layer material since it can be coupled to light outside fiber optic networks and guide light generated by on-board GaAs lasers without causing excessive attenuation of either signal. Other waveguide materials like etched silicon and some glasses are only transparent in one of these regimes.

Moreover, polysilane materials are also stable at high temperatures. Conventional polysilane degrades via sublimation at temperature above 500° C.

The deposition of polysilane thin films is not feasible without the use of CVD. Conventional methods for synthesizing polysilanes results in a material that is virtually intractable. Polysilanes are not soluble in most cases, so spin coating is not an option. Polysilanes also do not melt. Instead, they eventually decompose at high temperatures and sublime.

CVD deposition of polysilanes can occur with substrate temperatures under 100° C. Therefore, the fabrication of polysilanes described herein is not restricted to the use of silicon or glass substrates. Other materials, such as transparent or flexible plastics, fabrics, and paper are also realistic choices. This potentially enables the development of a roll-to-roll continuous manufacturing process for the production of printed waveguide layers. The freedom to choose from a wide variety of substrate materials will also aid in the improvement of optical solder bump research. Some schemes involve photoinitiated polymerization of organics that might be used in a flipchip process to bond devices to an interconnect board. The transparent substrate allows solder bump materials to be irradiated through the substrate underneath the positioned photonic chip.

The invention can also use other CVD techniques, such as pyrolytic CVD. Pyrolytic CVD depends on the generation of radicals from precursor gases, but the energy is supplied thermally instead of using plasma. An example can be the hot filament CVD (HFCVD), which uses a filament array to allow the substrate temperature to be controlled, improving the versatility of the molecular design. Moreover, the HFCVD does not result in nonselective monomer fragmentation to the extent that PECVD does. There is no electric field to accelerate the ions, thus HFCVD can reduce the amount of branching that is observed in the film as well as damage to the surface due to ion bombardment.

Although the present invention has been shown and described with respect to several preferred embodiments thereof, various changes, omissions and additions to the form and detail thereof, may be made therein, without departing from the spirit and scope of the invention.

What is claimed is:

1. A waveguide structure comprising:
   a substrate; and
   a waveguide layer comprising polysilane formed using a CVD process said, said waveguide layer having a size between 2 µm and 5 µm;

a cladding layer that includes a low index material that substantially encompasses said waveguide layer, which is patterned using a UV light source to form said waveguide structure; and said waveguide layer acts as an interconnection layer that is coupled to said cladding layer so as to interconnect said waveguide structure to at least one photonic device having an optical core with a diameter less than 10 µm and said waveguide layer allowing the transmission of an optical signal with a wavelength greater than 400 nm.

2. The waveguide structure of claim 1, wherein said substrate comprises a high index substrate.

3. The waveguide structure of claim 2, wherein said high index substrate comprises a silicon substrate.

4. The waveguide structure of claim 1, wherein said substrate comprises a low index substrate.

5. The waveguide structure of claim 4, wherein said low index substrate comprises a glass or plastic substrate.

6. The waveguide structure of claim 1, wherein said cladding comprises $SiO_2$ or OSG.

7. The waveguide structure of claim 6 further comprising a low index layer provided on said waveguide layer of high index materials.

8. The waveguide structure of claim 1, wherein said waveguide layer is formed using PECVD.

9. The waveguide structure of claim 1, wherein said polysilane is formed using a pyrolytic CVD process.

10. A method of forming a waveguide structure, said method comprising:
    providing a substrate;
    forming a waveguide layer comprising polysilane using a CVD process, said waveguide layer having a size between 2 µm and 5 µm;
    forming a cladding layer comprising a low index material; and
    patterning said polysilane of said waveguide layer using a UV light source to form said waveguide structure;
    wherein said waveguide layer acts as an interconnection layer that is coupled to said cladding layer so as to interconnect said waveguide structure to at least one photonic device having an optical core with a diameter less than 10 µm and allowing the transmission of an optical signal with a wavelength greater than 400 nm.

11. The method of claim 10, wherein said substrate comprises a high index substrate.

12. The method of claim 11, wherein said high index substrate comprises a silicon substrate.

13. The method of claim 10, wherein said substrate comprises a low index substrate.

14. The method of claim 10, wherein said substrate comprises a glass or plastic substrate.

15. The method of claim 10, wherein said cladding comprises $SiO_2$ or OSG.

16. The method of claim 15 further comprising a low index layer provided on said waveguide layer of high index materials.

17. The method of claim 10, wherein said polysilane is formed using PECVD.

18. The method of claim 10, wherein said waveguide layer is formed using a pyrolytic CVD process.

* * * * *

UNITED STATES PATENT AND TRADEMARK OFFICE
CERTIFICATE OF CORRECTION

| | | |
|---|---|---|
| PATENT NO. | : 7,190,871 B2 | Page 1 of 1 |
| APPLICATION NO. | : 10/410061 | |
| DATED | : March 13, 2007 | |
| INVENTOR(S) | : Lock et al. | |

It is certified that error appears in the above-identified patent and that said Letters Patent is hereby corrected as shown below:

Please insert the following sponsorship information at column 1, line 3 of the issued patent:

--This invention was made with government support under Grant No. 2131100, awarded by the National Science Foundation. The government has certain rights in this invention.--

Signed and Sealed this

Nineteenth Day of April, 2011

David J. Kappos
*Director of the United States Patent and Trademark Office*